(12) United States Patent
Riat

(10) Patent No.: US 7,012,509 B2
(45) Date of Patent: Mar. 14, 2006

(54) DEVICE FOR DETECTING A RUNNING SURFACE FOR VEHICLE AND VEHICLE USING SAME

(75) Inventor: Jean-Christophe Riat, Bezons (FR)

(73) Assignee: Peugeot Citroen Automobiles SA, Velizy-Villacoublay (FR)

( * ) Notice: Subject to any disclaimer, the term of this patent is extended or adjusted under 35 U.S.C. 154(b) by 161 days.

(21) Appl. No.: 10/474,484

(22) PCT Filed: Mar. 7, 2002

(86) PCT No.: PCT/FR02/00829

§ 371 (c)(1),
(2), (4) Date: Oct. 9, 2003

(87) PCT Pub. No.: WO02/077948

PCT Pub. Date: Oct. 3, 2002

(65) Prior Publication Data

US 2005/0039960 A1   Feb. 24, 2005

(30) Foreign Application Priority Data

Mar. 8, 2001   (FR) .................................. 0103163

(51) Int. Cl.
*B60Q 1/00*   (2006.01)

(52) U.S. Cl. .................. 340/435; 340/905; 340/904; 702/150; 701/116

(58) Field of Classification Search ........ 340/435–439, 340/463, 465, 500, 532, 517; 701/116, 300, 701/301, 302; 180/168, 169; 702/150
See application file for complete search history.

(56) References Cited

U.S. PATENT DOCUMENTS

| 3,708,668 A | | 1/1973 | Tilley |
| 4,348,652 A | * | 9/1982 | Barnes et al. ............... 340/904 |
| 4,401,181 A | | 8/1983 | Schwarz |
| 5,225,827 A | | 7/1993 | Persson |
| 5,568,137 A | * | 10/1996 | Liu ............................ 370/905 |
| 5,982,278 A | | 11/1999 | Cuvelier |
| 6,038,496 A | * | 3/2000 | Dobler et al. .................. 701/3 |
| 6,157,320 A | | 12/2000 | Yujiri et al. |
| 6,498,570 B1 | | 12/2002 | Ross |
| 2002/0105438 A1 | | 8/2002 | Forbes et al. |

FOREIGN PATENT DOCUMENTS

| GB | 2317009 | 11/1998 |
| JP | 9-39601 | 2/1997 |

* cited by examiner

*Primary Examiner*—Jeffery Hofsass
*Assistant Examiner*—Eric Blount
(74) *Attorney, Agent, or Firm*—Nicolas E. Seckel

(57) ABSTRACT

The invention concerns a device for detecting a running surface for vehicle, comprising a plurality of sensors designed to be oriented towards the running surface to determine modifications thereof, means for processing the data concerning information picked up by the sensors, wherein at least part of the sensors are relatively arranged such that at least the transverse distances separating two adjacent points of aim on the ground of the sensors increase towards a longitudinal axis and along a direction substantially perpendicular to this axis. The invention also concerns a vehicle using this device.

16 Claims, 2 Drawing Sheets

DEVICE FOR DETECTING A RUNNING SURFACE FOR VEHICLE AND VEHICLE USING SAME

Figure 1:
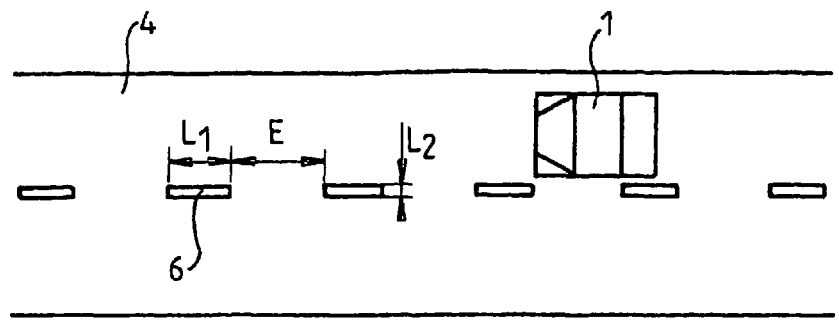

The invention relates to a device for detecting a running surface for vehicle and to a vehicle using such a detection device.

The invention concerns more particularly a detection device comprising a plurality of sensors designed to be oriented towards a running surface to determine modifications thereof, as well as means for processing the data concerning information picked up by the sensors.

Document EP 860001 describes such a detection device applied to a vehicle and using infrared sensors in order to signal to a vehicle user a possible change in the running surface or the crossing of a marking line on the ground.

Operation of this type of device is globally satisfying, but in some cases, it does not enable detecting with sufficient quality all the modifications of the running surface.

An object of the present invention is to propose a device for detecting a running surface having an improved detection ability with respect to the prior art, while having a simple and cost-effective structure.

To this effect, the device according to the invention, which is otherwise conform to the generic definition provided in the preamble above, is essentially characterized in that at least part of the sensors are relatively arranged such that the transverse distances separating two adjacent points of aim on the ground of sensors increase in the direction of a longitudinal axis and along a direction substantially perpendicular to this axis.

Moreover, the invention can include one or several of the following features:

- the device comprises at least five sensors,
- the sensors are located on both sides of a median longitudinal axis, and the transverse distances between the points of aim on the ground of the sensors are substantially symmetrical with respect to this axis,
- the transverse distance dn in cm separating two adjacent points of aim on the ground of sensors is given by the formula $dn = k \cdot R^n$, where n is the serial number of the point of aim on the ground in the direction of the longitudinal axis, R is a first constant multiplicative coefficient comprised between about 1 and about 2, and k is a second constant coefficient comprised between about 5 and about 50,
- the transverse distance dn in cm separating two adjacent points of aim on the ground of sensors is given by the formula $$dn = L2 \cdot \left( \frac{E + L1}{E + 2c} \right)^n,$$

so as to detect in particular a discontinuous marking line of the ground, and where n is the serial number of the point of aim on the ground in the direction of the longitudinal axis, L1 is the length in cm of a dash of the discontinuous line, L2 is the width in cm of a dash of the discontinuous line, E is the distance in cm separating two consecutive dashes, and c is a determined constant defining a detection security margin in cm.

Another object of the invention is to propose a vehicle using such a detection device and remedying all or part of the drawbacks of the prior art.

To this effect, the vehicle according to the invention, comprising a plurality of sensors oriented towards the running surface, to determine modifications thereof, means for processing data concerning information picked up by the sensors, is characterized in that at least part of the sensors are relatively arranged such that the transverse distances separating two adjacent points of aim on the ground of sensors increase from the outside towards the inside of the vehicle along a direction substantially perpendicular to the median longitudinal axis of the vehicle.

Moreover, the invention can include one or several of the following characteristics:

- the sensors are located on both sides of the median longitudinal axis of the vehicle, and the transverse distances between the points of aim on the ground of the sensors are substantially symmetrical with respect to this axis,
- the transverse distance dn in cm separating two adjacent points of aim on the ground of sensors is given by the formula $dn = k \cdot R^n$, where n is the serial number of the point of aim on the ground in the direction of the longitudinal axis, R is a first constant multiplicative coefficient comprised between about 1 and about 2, and k is a second constant coefficient comprised between about 5 and about 50,
- the transverse distance dn in cm separating two adjacent points of aim on the ground of sensors is given by the formula $$dn = L2 \cdot \left( \frac{E + L1}{E + 2c} \right)^n,$$

so as to detect in particular the position of the vehicle with respect to a discontinuous marking line on the ground, and where n is the serial number of the point of aim on the ground of a sensor from the outside toward the inside of the vehicle, L1 is the length in cm of a dash of the discontinuous line, L2 is the width in cm of a dash of the discontinuous line, E is the distance in cm separating two consecutive dashes, and c is a determined constant defining a detection security margin in cm,
- the vehicle comprises eleven sensors,
- at least part of the sensors are oriented laterally towards the outside of the vehicle,
- at least part of the sensors are inclined with respect to the vertical at an angle substantially equal to or above the half-angle of their cone of vision,
- at least part of the sensors are inclined with respect to the vertical at an angle comprised between about 5 and about 45 degrees,
- at least part of the sensors are disposed in the front bumper of the vehicle.

Figure 2:
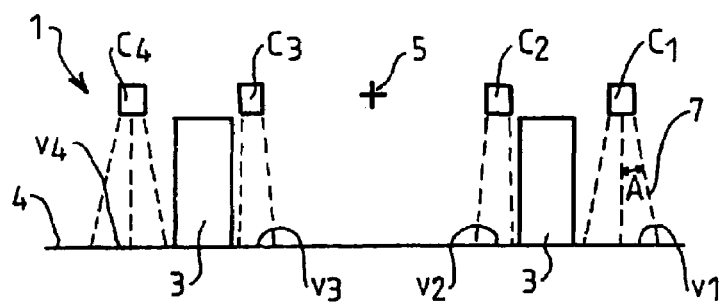
Figure 3:
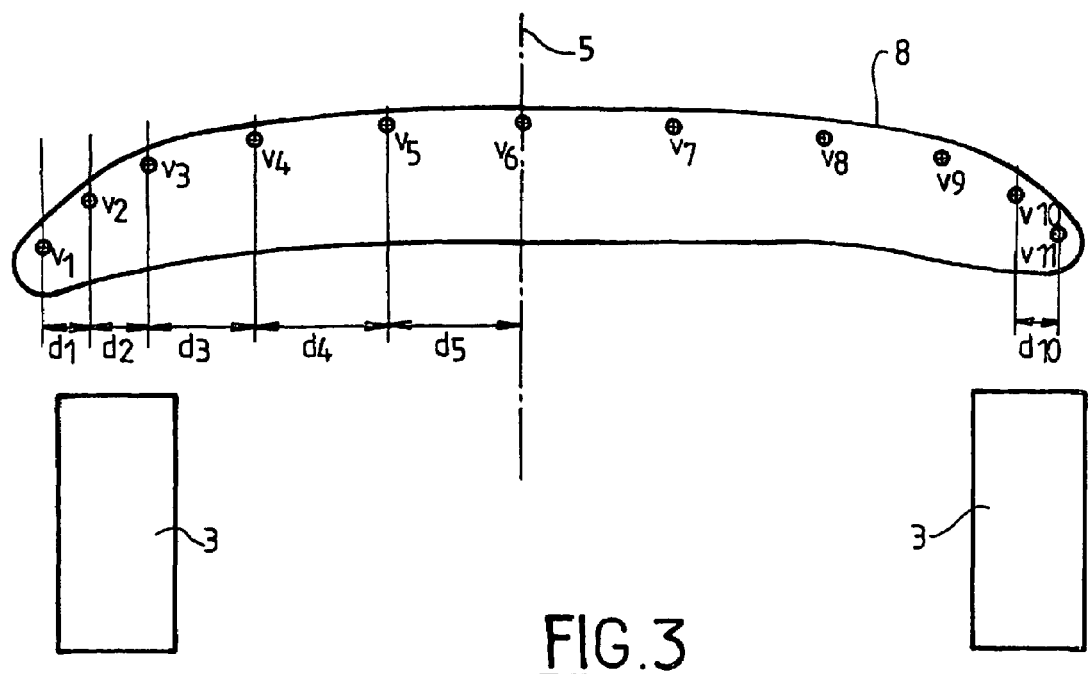
Figure 4:
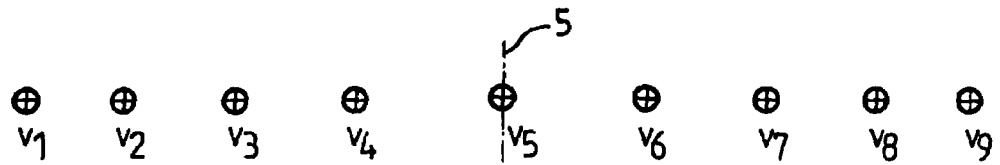
Figure 5:
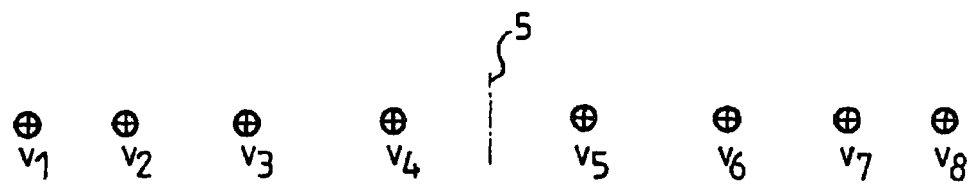
Figure 6:
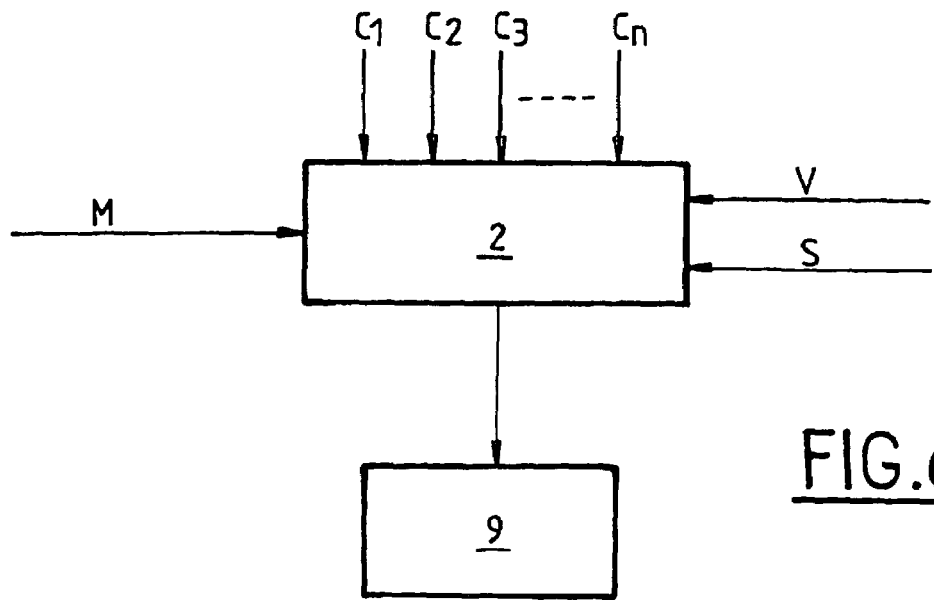

Other particularities and advantages will appear while reading the following description made in reference to the drawings in which:

FIG. 1 is a schematic top view of a vehicle on a road,

FIG. 2 is a schematic and partial front view of a vehicle illustrating a first arrangement of detection sensors according to the invention, FIG. 3 is a schematic top view of the front portion of a vehicle illustrating the repartition of the points of aim on the ground of a second preferred arrangement of detection sensors according to the invention, FIGS. 4 and 5 show respective third and fourth repartitions of the points of aim on the ground of detection sensors according to the invention, FIG. 6 is a block diagram of an example of structure and operation of a detection device according to the invention.

The device for detecting a running surface according to the invention illustrated in particular on FIGS. 2 and 6 comprises a plurality of sensors c1 to cn connected to means 2 for data processing, such as a computer.

In the embodiment described above, the sensors are mounted on a vehicle 1 and oriented towards the running surface 4 to detect modifications thereof, and in particular the apparition of markings on the ground. The processing means 2 are constituted, for example, by a computer of a multiplexed network of the vehicle 1.

According to the invention, the vehicle 1 comprises a plurality of sensors arranged relatively such that the transverse distances separating two adjacent points of aim on the ground increase from the outside towards the inside of the vehicle 1 along a direction substantially perpendicular to the median longitudinal axis 5 of the vehicle.

Indeed, surprisingly, such an arrangement of sensors confers an improved detection quality, as compared to prior art systems. In particular, it is observed that the invention enables a more secure and more comprehensive detection of a discontinuity in the surface and in particular a marking line on the ground.

In the embodiment shown on FIG. 2, the vehicle comprises four sensors c1 to c4 distributed with one half on each side of the vehicle 1. Each sensor c1 to c4 has a surface or point of aim on the ground, respectively v1 to v4. Preferably, the four sensors c1 to c4 are arranged in a substantially symmetrical manner with respect to the median longitudinal axis 5 of the vehicle. The two points of aim on the ground v1, v2 or v4, v3 of the sensors located on a same side of the vehicle are, for example, separated by a distance of about 8 to about 25 cm, and preferably about 12 cm. The points of aim on the ground v2, v3 of the sensors c2, c3 closest to the median longitudinal axis 5 are, for their part, separated by a distance of about 1 m to 1.8 m.

In variant, and preferably, the device according to the invention comprises at least five sensors, so that the arrangement of FIG. 2 can be modified by adding an additional sensor in the area of the median longitudinal axis 5 of the vehicle. The point of aim on the ground of the fifth sensor can be located at the same distance from the points of aim v2, v3 on the ground of the two adjacent sensors c2, c3.

In another advantageous variant, the transverse distance dn in cm separating two adjacent points of aim on the ground vn, vn+1 of the sensors is given by the formula $dn = k \cdot R^n$, where n is the serial number of the point of aim on the ground from the outside toward the inside of the vehicle, R is a first constant multiplicative coefficient comprised between about 1 and about 2, and k is a second constant coefficient comprised between about 5 and about 50.

As before, this arrangement confers an improved detection as compared to prior art systems, while combining structural simplicity and low cost.

In yet another advantageous variant, the positioning of the sensors can be adapted in particular to the detection of discontinuous marking lines on the ground. Thus, the transverse distance dn in cm separating two adjacent points of aim on the ground vn, vn+1 can be given by the formula $$dn = L2 \cdot \left( \frac{E + L1}{E + 2c} \right)^n,$$

where n is the serial number of the point of aim on the ground vn of a sensor from the outside towards the inside of the vehicle, L1 is the length in cm of a dash 6 of the discontinuous line, L2 is the width in cm of a dash 6 of the discontinuous line, E is the distance in cm separating two consecutive dashes 6, and c is a determined constant defining a detection security margin in cm (FIG. 1).

The detection security margin is selected arbitrarily as a function of intended applications and of the detection precision desired. The security margin c constitutes the minimal monitoring distance on the ground by a sensor from which a change can be considered a possible marking. This is to say that the security margin c acts like a filter-forming distance, so as not to take into account small objects present on the running surface 4, such as papers. The security margin c can be fixed to a value comprised, for example, between 0 and 50 cm, preferably about 20 cm.

This arrangement of sensors according to the invention enables a secure detection of modifications in the running surface of the vehicle 1, and is well adapted in particular to the detection of a discontinuous marking on the ground.

In particular, it has been observed that such an arrangement enables a secure and early detection of a drifting by a vehicle with respect to its trajectory, in particular with respect to a discontinuous line of a marking on the ground. Indeed, when the vehicle drifts from its trajectory with a low incidence angle, and when the running surface changes (for example, crossing a discontinuous marking), the sensors having points of aim on the ground v1, vn disposed the farthest to the outside of the vehicle detect this situation. A drifting with a slightly higher incidence angle is detected by the subsequent sensors having points of aim v2, vn−1 in the direction of the inside of the vehicle, and so on.

This is to say that it has been observed that, the lower the incidence angle of the vehicle with respect to a border (discontinuous marking of other modification of the surface), the more the detection is made by sensors having points of aim on the ground located outside the vehicle. This detection by the so-called "outside" sensors enables an early detection of a possible drifting by the vehicle with respect to its trajectory.

In order to scale the device so as to detect any discontinuous marking on the ground, i.e., so that it adapts itself to the different markings in different countries, one can use the formula $$dn = L2 \cdot \left( \frac{E + L1}{E + 2c} \right)^n,$$

while fixing the width of a dash L2 to its lowest possible value encountered.

Similarly, the factor $$\frac{E + L1}{E + 2c}$$

is fixed to its lowest possible value encountered.

Thus, in the case of most European countries, the minimal width L2 of a dash is in the order of 10 cm whereas the factor $$\frac{E+L1}{E+2c}$$

is substantially equal to 1.2 (security margin fixed to 20 cm). Thus, in a particularly advantageous embodiment, the transverse distance dn in cm separating two adjacent points of aim on the ground vn, vn+1, can be given by the formula: $dn=10\times1.2^n$.

The vehicle shown on FIG. 3 comprises eleven sensors located in the front fender 8 of the vehicle, in front of the front wheels 3 of the vehicle, and in accordance with the formula above. The eleven sensors are only symbolized by their corresponding points of aim on the ground v1 to v11.

Thus, the distance d1 between the first v1 and second v2 points of aim on the ground is substantially equal to 12 cm; la distance d2 between the second v2 and third points of aim on the ground v3 is substantially equal to 14.4 cm; the distance d3 between the third v3 and fourth v4 points of aim on the ground is substantially equal to 17.3 cm; the distance d4 between the fourth v4 and fifth v5 points of aim on the ground is substantially equal to 20.7 cm; and the distance d5 between the fifth v5 and sixth v6 points of aim on the ground is substantially equal to 25 cm. In such a construction in which there is an odd number of sensors, a point of aim on the ground v6 is located substantially in the area of the median longitudinal axis of symmetry.

The points of aim on the ground v11 to v6 located on the other side of the median longitudinal axis 5 of the vehicle are arranged in a substantially symmetrical manner with respect to this axis 5 (d10=d1).

FIGS. 4 and 5 illustrate two other examples of arrangements of detection sensors comprising nine and eight sensors, respectively, disposed symmetrically with respect to respective axes 5 of symmetry.

In the embodiment of FIG. 4, the successive transverse distances separating the adjacent points of aim on the ground v1 to v5 in the direction of the axis 5 can be substantially equal to 12 cm; 14.4 cm; 17.3 cm; and 45.7 cm, respectively.

In the embodiment of FIG. 5, the successive transverse distances separating the adjacent points of aim on the ground v1 to v5 an the direction of the axis 5 may be substantially equal to 12 cm; 14.4 cm; 17.3 cm; and 90 cm, respectively.

According to the invention, the sensors cn and thus, their points of aim on the ground vn can be arranged indifferently along directions parallel to the longitudinal axis 5 of the vehicle. Preferably, however, the sensors cn and thus their points of aim on the ground vn are located in the front portion of the vehicle, so as to detect a variation in the running surface 4 as early as possible. Similarly, the sensors can be disposed in any other portion of the vehicle, for example, in the rear view mirrors. Additionally, in other applications, the device can comprise more than eleven sensors (in particular in the case of a truck).

The above-described sensors are preferably constituted by systems comprising wave emission means in a range that is little disturbed by light, for example, infrared waves, and means for receiving the reflected waves. Of course, these infrared sensors can be replaced by or juxtaposed with ultrasound sensors and/or video sensors or any other equivalent system.

Of course, the invention is not limited to the embodiments described above. Thus, one can envision a detection device in which sensors are located only on one side of the vehicle, to monitor a modification of the surface solely on the side concerned.

Besides, all or part of the sensors can be laterally oriented towards the outside of the vehicle.

In particular, the sensors can be inclined towards the front or the back and/or towards a side of the vehicle with respect to the vertical.

Preferably, the inclination angle of the sensors with respect to the vertical is substantially equal to or above to the half angle A of their cone of vision 7. The cone of vision 7 of a sensor constitutes the angular reception window of the sensor (FIG. 2).

Preferably, the sensors are inclined with respect to the vertical at an angle comprised between about 5 and about 45 degrees and preferably equal to about 15 degrees.

The orientation of the sensors defined above associates a good detection quality of the ground with a precocious detection. Indeed, one notices that the size, the shape and the position obtained by the points of aim on the ground of the signals emitted by the sensors improve the detection quality of the system, as compared to the prior art.

Preferably, the surface on the ground aimed at by a sensor describes a substantially elliptical or circular track having a diameter in the order of about 5 to about 10 cm. In addition, the sensors are preferably located at a height above the ground comprised between 15 cm and 1 m.

Referring to FIG. 6, the detection device can be used to warn the driver of a possible drifting by the vehicle from its trajectory. As a function of information delivered by the sensors c1 to cn, the data processing means 2 can activate security means 9 such as means for signaling to the outside (blinkers, for example), or to the vehicle user (light and/or sound and/or tactile warning).

Advantageously, activation or not of the security means 9 can also be conditioned by information M representative of the start-up or not of the detection system (switch, for example), and/or as a function of the speed V of the vehicle, and/or as a function of an activated state S or not of the vehicle blinkers.

This is to say that the monitoring and security system can include a switch to control its start-up or its shut down, which can be actuated by the vehicle user.

One can also envision an activation of the monitoring and alert device only when the speed V of the vehicle is above a threshold in the order, for example, of 80 km/h.

Preferably also, the data processing means activate the security means 9 only when a crossing is detected quasi simultaneously on both sides of the vehicle. In this manner, the normal crossing of a transverse line is not signaled to the vehicle user.

Similarly, the alert and security means 9 can be activated only when the detection of an abnormal discontinuity by a first sensor is confirmed by at least a second measurement made by an adjacent sensor.

Finally, even though the invention has been described in connection with particular embodiments, it includes all the technical equivalents to the means described.

The invention claimed is:

1. Device for the detection of a running surface for a vehicle, comprising a plurality of sensors designed to be oriented towards the running surface to determine modifications thereof, means for processing data concerning information collected by the sensors, wherein at least part of the sensors are relatively arranged such that the transverse distances separating two adjacent points of aim on the ground of sensors increase in the direction of a longitudinal axis and along a direction substantially perpendicular to this axis.

2. Detection device according to claim 1, which comprises at least five sensors.

3. Detection device according to claim 1, wherein the sensors are located on both sides of a median longitudinal axis, and the transverse distances between the points of aim on the ground of the sensors are substantially symmetrical with respect to this axis.

4. Detection device according to claim 1, wherein the transverse distance dn in cm separating two adjacent points of aim on the ground of sensors is given by the formula $dn=k.R^n$, where n is the serial number of the point of aim on the ground in the direction of the longitudinal axis, R is a first constant multiplicative coefficient comprised between about 1 and about 2, and k is a second constant coefficient comprised between about 5 and about 50.

5. Detection device according to claim 1, wherein the transverse distance dn in cm separating two adjacent points of aim on the ground of sensors is given by the formula $$dn = L2 \cdot \left(\frac{E + L1}{E + 2c}\right)^n,$$

so as to detect in particular a discontinuous marking line on the ground, and where n is the serial number of the point of aim on the ground in the direction of the longitudinal axis, L1 is the length in cm of a dash of the discontinuous line, L2 is the width in cm of a dash of the discontinuous line, E is the distance in cm separating two consecutive dashes, and c is a determined constant defining a detection security margin in cm.

6. Vehicle using a detection device according to claim 1, comprising a plurality of sensors oriented towards the running surface to determine modifications thereof, means for processing data concerning information collected by the sensors, wherein at least part of the sensors are relatively arranged such that the transverse distances separating two adjacent points of aim on the ground of sensors increase from the outside towards the inside of the vehicle along a direction substantially perpendicular to the median longitudinal axis of the vehicle.

7. Vehicle according to claim 6, wherein the sensors are located on both sides of the median longitudinal axis of the vehicle, and the transverse distances between the points of aim on the ground of the sensors are substantially symmetrical with respect to this axis.

8. Vehicle according to claim 6, wherein the transverse distance dn in cm separating two adjacent points of aim on the ground of sensors is given by the formula $dn=k.R^n$, where n is the serial number of the point of aim on the ground in the direction of the longitudinal axis, R is a first constant multiplicative coefficient comprised between about 1 and about 2, and k is a second constant coefficient comprised between about 5 and about 50.

9. Vehicle according to claim 6, wherein the transverse distance dn in cm separating two adjacent points of aim on the ground of sensors is given by the formula $$dn = L2 \cdot \left(\frac{E + L1}{E + 2c}\right)^n,$$

so as to detect in particular the position of the vehicle with respect to a discontinuous marking line on the ground, and where n is the serial number of the point of aim on the ground of a sensor from the outside towards the inside of the vehicle, L1 is the length in cm of a dash of the discontinuous line, L2 is the width in cm of a dash of the discontinuous line, E is the distance in cm separating two consecutive dashes, and c is a determined constant defining a detection security margin in cm.

10. Vehicle according to claim 6, which comprises eleven sensors.

11. Vehicle according to claim 6, wherein at least part of the sensors are oriented laterally towards the outside of the vehicle.

12. Vehicle according to claim 6, wherein at least part of the sensors are inclined with respect to the vertical at an angle substantially equal to or above the half-angle of their cone of vision.

13. Vehicle according to claim 6, wherein at least part of the sensors are inclined with respect to the vertical at an angle comprised between about 5 and about 45 degrees.

14. Vehicle according to claim 6, wherein at least part of the sensors are disposed in the front bumper of the vehicle.

15. Detection device according to claim 4, wherein R is comprised between about 1 and about 1.2.

16. Vehicle according to claim 8, wherein R is comprised between about 1 and about 1.2.

* * * * *